United States Patent [19]

Kenyon et al.

[11] Patent Number: 4,524,906
[45] Date of Patent: Jun. 25, 1985

[54] TEMPERATURE CONTROL VALVE AND SENSOR/CONTROLLER THEREFOR

[75] Inventors: Richard L. Kenyon, Irvine; Calvin E. Kempton, Laguna Hills, both of Calif.

[73] Assignee: Parker-Hannifin Corporation, Cleveland, Ohio

[21] Appl. No.: 448,691

[22] Filed: Dec. 10, 1982

Related U.S. Application Data

[63] Continuation of Ser. No. 173,660, Jul. 29, 1980, abandoned, which is a continuation of Ser. No. 869,255, Jan. 13, 1978, abandoned.

[51] Int. Cl.³ .................. G05D 23/00; F16K 31/12
[52] U.S. Cl. ............................... 236/12.11; 236/84; 251/30
[58] Field of Search ................ 236/80 E, 75, 84, 13, 236/87, 12.11; 251/30, 33

[56] References Cited

U.S. PATENT DOCUMENTS

| | | | |
|---|---|---|---|
| 2,464,945 | 3/1949 | Rouse | 236/86 |
| 2,975,976 | 3/1961 | Smith et al. | 236/86 |
| 3,434,690 | 3/1969 | Troncale, Sr. | 251/30 |

*Primary Examiner*—William E. Wayner
*Attorney, Agent, or Firm*—Maky, Renner, Otto & Boisselle

[57] ABSTRACT

A hot air modulating valve for mixing hot air with cold air flowing in a duct, the modulating valve having a torque motor operated pilot valve to position the modulator valve to maintain a predetermined temperature of the hot air-cold air mixture. The temperature of the mixture is sensed by a thermistor which in conjunction with a tri-mode (proportional plus integral plus derivative) electronic controller which provides an input current signal to the torque motor to position the modulator valve in proportion to the input current signal, produces zero steady state errors, and provides an anticipation effect to compensate for control system time lags. The controller has auxiliary inputs which when exceeding predetermined values switch the air mixture temperature at the thermistor to a lower setting. The modulating valve has a relatively low gain during the initial portion of its opening stroke to improve system dynamic stability and has a position feedback to the torque motor operated pilot valve.

14 Claims, 4 Drawing Figures

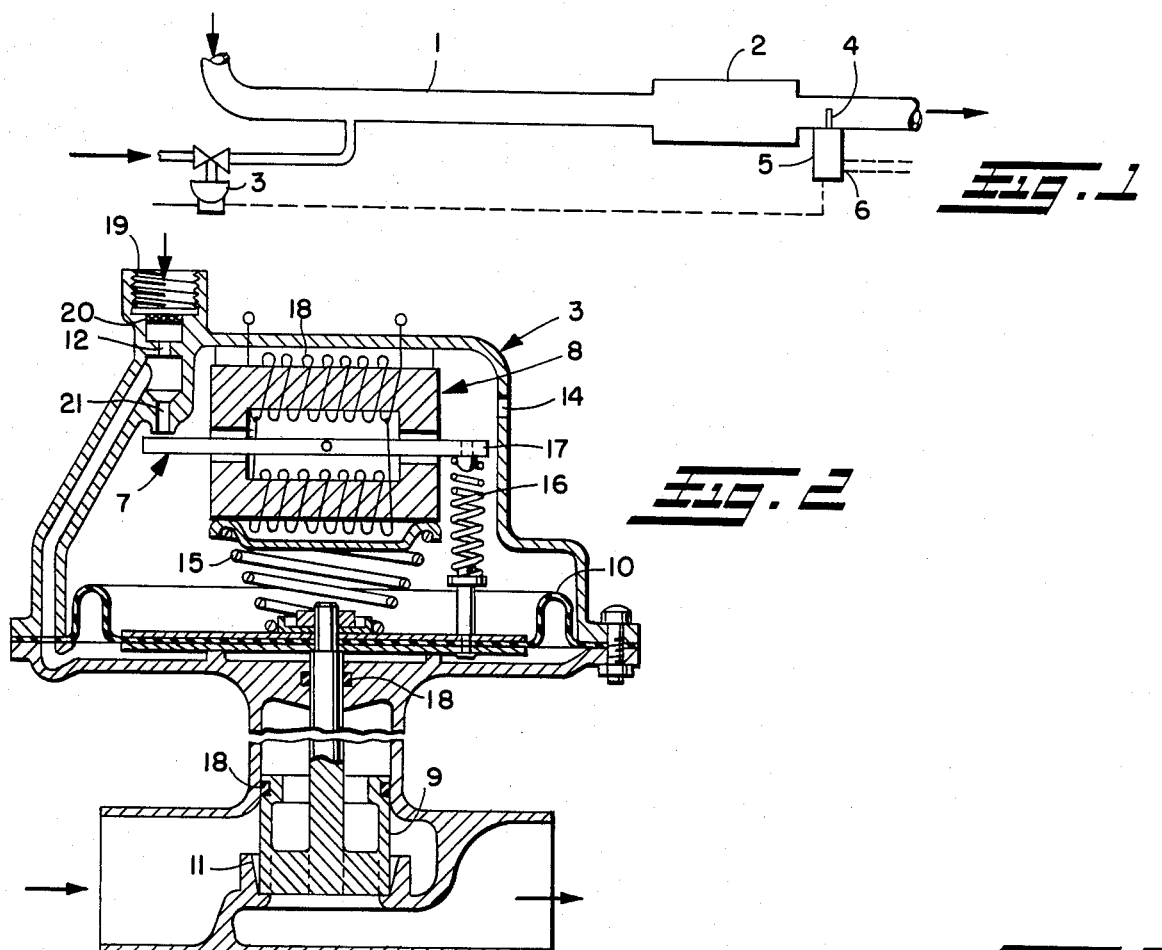

TEMPERATURE CONTROL VALVE AND SENSOR/CONTROLLER THEREFOR

BACKGROUND OF THE INVENTION

This application is a continuation of 173,660, filed July 24, 1980, which is a continuation of 069,255, filed Jan. 13, 1978 both now abandoned.

In an automatic process control system, it is well known to employ a control valve as the final element in the control loop which serves as a continuously variable orifice to change the rate of flow of the control agent. Pneumatic operation of the control valve actuator is the most widely used method in process control which generally utilizes a flapper-nozzle type of control unit in which a sensing device moves the flapper toward or away from the nozzle to vary the position of the control valve. By adding appropriate bellows, capacity and restriction, the pneumatic controller may provide for operation in the proportional control mode, the proportional plus reset (integral) control mode, the proportional plus rate (derivative) control mode, or the proportional plus reset plus rate control mode.

It is also known to provide electric and electronic controllers for operation of the control valve in a proportional control mode or in the aforesaid dual and three modes by feeding the output from the controller to an electric to pneumatic transducer to operate the pneumatic control valve or to an electrical operator.

SUMMARY OF THE INVENTION

The temperature control valve and sensor/controller herein is designed for use in the moisture separator stage of an aircraft anti-icer system in which hot air is mixed with refrigerated air upstream of the moisture separator in a quantity to maintain a predetermined air temperature at the moisture separator outlet, the temperature at the separator outlet being sensed by a thermistor whose resistance decreases with increasing temperature and which in conjunction with the electronic controller provides an output current to the torque motor of the hot air modulating valve to position the valve in the proportional plus integral plus derivative mode. The invention is further characterized in that the torque motor operates the flapper of a flapper-nozzle control unit which constitutes a servo pilot valve to control the pressure differential on opposite sides of the valve actuating diaphragm. The hot air modulating valve also has a position feedback to the servo pilot to maintain an equilibrium position where the modulating valve has stroked open an amount proportionate the input current from the electronic controller.

The electronic controller has provision for processing Mach number and altitude signals from an air data computer to switch the controller to a lower temperature setting when both the Mach number and altitude signals exceed predetermined values.

BRIEF DESCRIPTION OF THE DRAWING

FIG. 1 is a schematic diagram of the moisture separator stage of an aircraft anti-icer system showing a hot air modulating valve assembly and the sensor/controller therefor for maintaining a predetermined temperature at the moisture separator outlet by introducing hot air for mixing with refrigerated air upstream of the moisture separator.

FIG. 2 is a cross-section view of the hot air modulating valve assembly.

FIG. 3 is a block diagram of the sensor/controller unit.

FIG. 4 is a schematic wiring diagram of the sensor/controller unit.

DETAILED DESCRIPTION OF A PREFERRED EMBODIMENT

FIG. 1 illustrates the moisture separation stage of an aircraft anti-icer system in which refrigerated air flows through the duct 1 into the moisture separator 2. A hot air modulating valve assembly 3 introduces hot air into the duct 1 upstream of the moisture separator 2 for mixing with the refrigerated air to maintain a predetermined temperature at the moisture separator outlet. The predetermined air mixture temperature may be, for example, 35±2° F. which is sensed by a thermistor 4 and which through the electronic controller 5 provides an output signal to the modulating valve assembly 3 to position it so that the right amount of hot air is mixed with the refrigerated air. The controller monitors Mach number and altitude via inputs 6 from an air data computer (not shown) and automatically switches to an alternate predetermined air temperature setting of say 0±5° F. when both the Mach number and altitude signals exceed predetermined values.

As shown in FIG. 2, the temperature control or hot air modulating valve assembly 3 comprises a pilot valve 7 to control servo air pressure, a torque motor 8 to operate the pilot valve 7 in response to input current signal and hot air valve position feedback signal, and a hot air valve 9 actuated by a diaphragm 10 having a pressure differential established thereacross and controlled by the pilot valve 7. As hereinafter explained in detail, the hot air modulating valve 9 is automatically moved to a position proportional to the input current signal to the torque motor 8. The flow area through the hot air valve 9 is a function of hot air valve position and by reason of the taper 11 the initial portion of the opening stroke of the valve 9 has a low gain to improve system dynamic stability at low flow rates whereas the rest of the valve stroke has a high gain.

In operation, servo air enters through a fixed bleed orifice 12, then passes through a nozzle-flapper pilot valve 7 which controls the pressure drop across the actuator diaphragm 10. The bleed flow then exits from chamber 10b to atmosphere via an orifice 14. When the unit is in the unpressurized state, the preload force of the valve spring 15 holds the hot air valve 9 fully closed and the force of the feedback spring 16 pushes the torque motor armature 17 (the flapper of the pilot valve 7) fully counterclockwise, opening the nozzle-flapper pilot valve 7 completely.

When servo air pressure is applied, with zero current input signal from the sensor 4/controller 5, the wide-open nozzle-flapper valve 7 will cause the pressure drop across the actuator diaphragm 10 to be very low, so as not to overcome the spring 15 preload holding the valve 9 closed.

When input current is applied to the torque motor 8 by the sensor 4/controller 5, the torque motor 8 will generate a force proportional to the current. The torque motor armature 17 is positioned by the force balance between torque motor force and feedback spring 16 force. With the hot air valve 9 initially closed, the feedback spring 16 force will be less than torque motor 8 force, and the armature 17 will deflect clockwise, closing the nozzle-flapper pilot valve 7. This causes the pressure differential across the diaphragm 10 to increase. The valve 9 will begin to open at a 3-psi pressure differential. As the hot air valve 9 strokes open, the feedback spring 16 is compressed an amount proportional to the valve 9 stroke. A point of equilibrium will be reached when the valve 9 has stroked open an amount proportional to the input current. This system of positioning the hot air valve is very rapid, accurate and dynamically stable.

The torque motor 8 has magnetic air gaps which exert forces in push-pull to rotate the armature 17 through a limited angle. The magnetic flux path is made from high-permeability alloy, and the circuit is biased at a high magnetic flux level by means of permanent magnets (not shown). Two control coils 18 are connected in parallel, each of 80-ohms resistance.

The diaphragm-operated valve 9 is a pressure balanced poppet type valve, the balancing preventing the inlet and outlet pressures from exerting forces on the valve 9 that would tend to change its position. This prevents a common problem with air-operated servo valves, namely "buzzing" due to interaction between the inlet and outlet line dynamics and the servo actuator. The valve seat has a 20-degree included angle conical section 11 near the seat which reduces the "gain" (rate of change of flow area) at low flow rates. This helps in achieving a dynamically stable temperature control.

The large (4.91 in.$^2$) diaphragm 10 provides a frictionless means of actuating the valve 9. The only friction force is about ±1.5 pounds from the seals 22 which is overcome by only ±0.3-psi pressure differential across the diaphragm 10.

To assure that the valve 9 always fails closed, it is spring-loaded closed with a 14.7-pound force of spring 15 which is almost ten times the seal 22 friction force, to assure reliable closing.

Referring further to the pilot valve 7, servo air pressure enters via a port 19, and passes through a protective screen 20, and then through a 0.025"-bleed orifice 12. Because most of the pressure drop is across the orifice 12, it is primarily responsible for controlling the consumption of servo air. At 18-psig servo air pressure, sea level altitude, and 70° F., the air consumption rate is only 0.015 lb/min.

The flow next passes through the nozzle-flapper pilot valve 7, the position of which controls the pressure difference across the hot air valve diaphragm 10. The 0.075"-diameter nozzle orifice 21 is preferably mounted for adjustment relative to the armature or flapper 17, to take up manufacturing tolerances. The flow from polit valve 7 in chamber 10b exits to atmosphere via the vent orifice 14. The purpose of the vent orifice 14 is to avoid the need for impractical and large flapper 17 strokes at high altitude by minimizing sensitivity to extreme variations in atmospheric and servo air pressure.

Referring to FIG. 3, the resistance of the temperature sensing resistor i.e. the thermistor 4 is compared to a fixed resistance in a standard bridge configuration as explained in connection with FIG. 4, which produces an output voltage proportional to the difference in temperature of the thermistor 4 from its desired temperature. This error voltage is amplified to produce an output current into the torque motor 8, which through the pilot valve 7 causes the valve 9 to open or close further as necessary to increase or decrease the air temperature to which the thermistor 4 is exposed.

The auxiliary input 6 voltages are processed by active signal processing circuits 23 which, for certain combinations of the inputs, cause the signal processing output voltage to change so as to add to the thermistor bridge error signal, thereby shifting the thermistor 4 temperature required to reduce the error signal to zero.

The current feedback network 24 is designed to produce a proportional-plus-integral response of the system. This means that the valve current may assume any value (within the limits of operation) when the error signal is essentially zero. This results in essentially zero temperature error during steady-state conditions. During dynamic stabilization the rate of change in valve current is proportional to the temperature error.

The open sensor detector 25 is a safety feature which causes the valve current to go to zero if the thermistor 4 becomes open circuited.

The voltage-clamp 26 is for the purpose of improving dynamic response when the auxiliary inputs 6 command a sudden reduction in controlled temperature because this results in a momentary reduction of output current to zero. At this time, a capacitor in the feedback network 24 would otherwise accumulate a charge which would degrade the dynamic performance.

Following is a detailed description of FIG. 4 which is the schematic circuit for the block diagram of FIG. 3.

Voltage Regulation—A simple zener circuit 27 regulates the voltage VR applied to the circuit components. Power (e10) to the hot air valve driver A2 is unregulated, as shown. Several components, including diode CR7 resistor R30, zener diode CR6, and capacitor C6, are arranged to protect against reversed polarity input and power supply transients.

Temperature Error Detection—The error in temperature is detected by means of a bridge circuit 28, using three resistors R15-16, R17, and R18 and the thermistor 4, all of which have equal resistances at 36° F. A nearly linear output of error voltage, i.e., the difference between e4 and e5, versus temperature is obtained. The bridge resistors R15-16, R17, and R18 change resistance with temperature by an amount which is negligible compared to the thermistor 4, so that ambient temperature changes cause negligible error. Power supply voltage changes do not cause any error in the setting, due to use of a bridge circuit.

Servovalve Driver—Integrated circuit amplifier A2 (Fairchild μA791) is excited by the error voltage e4 signal via operational amplifier A3 and controls the current delivered to the hot air modulating valve assembly 3 and particularly the coils 18 (FIG. 2) via the current limiting resistor R27 and terminals 3, 4 on the terminal connector 31 illustrated in FIG. 4. Output current is sensed by the voltage drop across a small resistor R28, and is used as a negative feedback signal to the amplifier A2. Thus, regardless of the variations in torque motor impedance, the amplifier output voltage e9 is automatically adjusted to the correct level to give a current proportional to the error voltage (difference between e4 and e5).

Dynamic Compensation—By means of resistors and capacitors placed in the input paths of A2, the error signal (difference between e4 and e5) is dynamically compensated. In particular, provision is made for anticipation by means of rate (lead) sensing due to the differentiating circuit of resistor R21 and capacitor C2. Provision is also made for integration (lag) of the error voltage by an integrating circuit of resistor R25 and capacitor C3. The integration is so arranged that it cannot accumulate an output with a "too hot" polarity; it only accumulates "too cold" outputs this being due, as aforesaid, to the voltage clamp 26 which may be internal to amplifier A2. The purpose of this is to prevent the accumulation of a large integrator output when the cold air temperature is above the setting. Such an output would be both useless (the hot air valve 9 is always fully closed whenever the error signal has the "too hot" polarity) but also harmful, as it would increase the undershoot when the refrigerated air temperature was reduced below the setting. The "tuning" of the dynamic compensation may be changed at any time without any major design changes. Replacement of resistors or capacitors on the PC board is all that is required.

Altitude Signal Monitoring—The Air Data Computer altitude input is monitored by the B section of A1 (National LM324) "quad" operational amplifier. A discrete (on-off) output signal is provided at the B section when altitude exceeds the preset value. A feedback resistor R6 provides the specified amount of hysteresis between switch point on increasing and decreasing altitudes.

Mach Number Signal Monitoring—The Air Data Computer Mach number signal is monitored by the A section of A1, in a similar manner to the altitude signal.

Setting Shift Logic—An "AND" gate comprising two diodes CR1 and CR2 is used to transmit a discrete (on-off) signal to the C section of A1, when both altitude and Mach number exceed their preset values. The C section then applies a voltage which provides bias that shifts the setting from 35° to 0° F. The rate of change of setting is precisely controlled by a feedback capacitor C1 on the C section.

Open-Circuited Sensor Detection—Electrical continuity in the thermistor 4 is constantly verified by the D section of A1, which monitors the voltage e4, as shown, by comparing the same with that of voltage e6 of a voltage divider circuit of resistors R20 and R23. Loss of continuity causes the voltage e4 to go to zero causing the D section output to switch to supply an override signal to the A2 hot air valve driver, forcing the output current to remain at zero. This keeps the hot air valve 9 closed.

Optional Setting—Terminals 30 are provided for attachment of a jumper wire, which will shift the setting up 2° F. to a 37° F. setting.

The operational amplifier sections A and B of A1 are connected to function as Schmitt triggers. Section B detects the required threshold voltage representing 30,000 ft. altitude when increasing, and causes the Section B output to go to approximately $V_R$. A design hysterisis of 4000 ft. is obtained on the basis of the ratio of R4 to R6 and the total voltage change at Section B output. Similarly, Section A of A1 detects the threshold voltage representing Mach 1.20 and switches back when the voltage represents Mach 1.00. When either Section A or Section B output is zero, current will flow through R7, causing voltage e1 to be less than e2. This causes current to flow in R10 which originates from the output of Section C and flows through diode CR3. Thus, e3 will be slightly higher than e2 (by the diode CR3 drop).

The value of e2 is selected so that e3 equals e5 when operating at 35° F. Thus, the current through R19 is zero and has no effect on the set point adjustment of R13 at this time. It should be noted that the stability of $V_R$ is not critical with respect to the operation of Section C because e3 and e5 will track one another if $V_R$ changes. When both Section A and B outputs go positive, R7 will no longer carry current. This causes e1 to shift such as to cause the current in R10 to reverse direction, with an equal magnitude. This current now flows through capacitor C1 from Section C output—causing e3 to ramp down to zero volts at a rate such as to rquire 13 seconds for the transition. This causes e5 to reduce by the amount required to represent e4 output when the sensor 4 temperature is 0° F.

Potentiometer R13 is factory-adjusted to obtain zero valve current when the sensor 4 temperature is 35° F.

Section D of A1 operates as a voltage comparator to determine if the sensor 4 becomes open circuited. The reference voltage e6 is on the order of 10 millivolts. Therefore, Section D output remains at $V_R$ under all normal circumstances. The voltage at Pin 9 of A2 is normally approximately 1.5 volts. Thus, diode CR4 will not conduct and Section D output will have no effect on the normal functioning of A2. However, if the sensor 4 becomes open-circuited, voltage e4 drops to zero volts, causing the output of Section D to go to ground (e.g. near zero volts or other relatively low level). This causes diode CR4 to conduct and, as a result, forces the output of A2 to go to zero, and shuts off the valve 9. The purpose of A3, which forms a voltage-follower stage, is to isolate e4 from R22, which would otherwise cause a current to flow in R15-R16 when the sensor 4 becomes open-circuited. This current would cause the minimum value of e4 to be too large at discriminate the presence of an open sensor 4.

Amplifier A2 has an open loop gain of greater than 25,000 over the operating temperature range and the differential input drift is typically 2 millivolts. Resistor R27 is for current limit sensing and is selected to limit output current to 0.25 amperes.

The operation of the servo-amplifier stage is as follows:

The operational summing point is e7.

The reference voltage is e5. Whenever e7 is greater than e5, the output of A2 goes to zero and when e7 is less than e5, the output goes toward its maximum limited current value of 0.25 amperes.

Resistor R24 may be included to limit the D.C. open-loop gain. Also, resistor R21 limits high frequency noise and capacitor C2 serves to differentiate the error signal, thereby compensating for the thermal time lag of the sensor 4.

The remaining components, namely C3, R25 and R22 perform the integration function. The proportional constant is the ratio of R25 to R22. The product of R22 and C3 is the integration constant.

Diode CR7 is for reverse polarity protection and to block negative transient spikes. R30 in combination with CR6 and C6 keeps the maximum voltage, e10, from exceeding 40 volts during transient conditions.

By way of summary, some of the features of the control set (valve assembly 3 and sensor 4/controller 5) are that it maintains the moisture separator 2 outlet within close limits e.g. 35°±2° F.; it monitors Mach number and altitude (via inputs 6 from an air data computer and switches to an alternate setting, e.g. 0°±5° F., when both Mach number and altitude exceed preset values; and it automatically positions the hot air throttling valve 9 so that required amount of hot air is mixed with the refrigerated air to give the correct mixed air temperature at the sensor 4.

Features of the sensor 4/controller 5 include:

A thermistor temperature-sensing probe 4 extends into the duct 1 downstream of separator 2 to measure temperature.

Integrated circuit modules A2 and A3 accurately measure the error signal and generate the control signal for the hot air modulating valve assembly 3 and amplifier module A1 provides further control features in response to auxiliary inputs plus open sensor detection.

Flexible, adjustable, dynamic compensation (integrating and differentiating) circuits give good stability, response, and accuracy.

Integrated circuit modules (Sections A and B of A1) examine the air data computer input signals, and switch to and from the alternate temperature setting under the specified conditions, providing a discrete mode of operation.

Emphasis has been placed on long-term stability of calibration by using a specially aged, high stability thermistor 4 and the most modern integrated circuits selected for their extremely low drift characteristics.

Features of the Hot Air Modulating Valve Assembly 3 include:

Rapid and accurate valve 9 positioning, by use of servo air pressure, controlled by a torque motor 8 and integral position servo loop (spring 16).

Freedom from high frequency buzz problems, due to pressure balanced throttling valve 9.

Freedom from sticking problems, due to large, frictionless actuator diaphragm 10, and a normally closed spring 15 preload that is 10 times greater than seal 18 friction forces.

The pilot valve 7 circuit minimizes sensitivity to extreme variations in atmospheric and servo air pressure, using a simple and effective vent orifice 14 technique.

The set is designed for safe, foolproof operation:
The hot air valve 9 fails closed:
On loss of servo air pressure
On loss of its electrical input current
On rupture of its operating diaphragm 10
On loss of power to the sensor 4/controller 5
On Open circuiting of the thermistor sensor 4

The hot air valve 9 will not stick, because of the large force margin in the closing spring 15, and the frictionless diaphragm 10 actuator.

The set remains in the 35° F. mode on loss of air data computer voltage.

Short circuiting the sensor 4/controller 5 output leads does not overload the unit. Reversal of leads does not permanently harm the unit.

Power supply transients are tolerated.

Air data computer inputs tolerate transients and are not permanently harmed by misconnection.

Insofar as dynamic performance of the control set is concerned, good dynamic performance is achieved by the tri-mode controller 5 (proportional plus derivative plus integral). The derivative action gives an anticipation effect that compensates for control system time lags. The integral action produces zero steady state errors. Controllers 5 of this type may be "tuned" to cope with a wide range of system operating conditions.

The embodiments of the invention in which an exclusive property or privilege is claimed are defined as follows:

1. An automatic process control system comprising control valve means providing a variable area orifice to change the rate of flow of a control agent to maintain a desired condition in the process, and a sensor/electronic controller of which the sensor detects a departure from the desired condition to produce an error signal which is processed by the controller to provide an output signal to said control valve means, said control valve means including a diaphragm actuated modulating valve, the diaphragm of which separates respective chambers on opposite sides thereof, means for providing system fluid to both said chambers for establishing a pressure differential on opposite sides of said diaphragm, said means for providing including motor operated pilot valve means for directing and controllably metering fluid flow to one of said chambers in response to actuation of said motor by said output signal to change the rate of flow of said control agent to restore the process to the desired condition, and means for venting system fluid from said one chamber to allow for such directed and controlled fluid flow to said one chamber, and said modulating valve having position feedback spring means bearing on said pilot valve means to reach a force equilibrium with the motor force acting on said pilot valve means when said modulating valve has stroked an amount proportional to said output signal.

2. The system of claim 1 wherein said means for venting includes an orifice operative to minimize sensitivity to variations in pressure downstream of said means for venting.

3. The system of claim 1 wherein said motor is housed within said one chamber.

4. The system of claim 1 wherein said pilot valve means controls the fluid pressure in both said chambers.

5. The system of claim 1 wherein said pilot valve means includes an orifice, and said motor is a torque motor having an armature operative to open and close said orifice.

6. The system of claim 1 wherein said controller has means providing an output signal for actuating said modulating valve in the proportional plus integral control mode.

7. The system of claim 1 wherein said controller has means providing an output signal for actuating said modulating valve in the proportional plus integral plus derivative control mode.

8. The system of claim 1 wherein said modulating valve is pressure balanced and is spring biased toward closed position when the force of the differential pressure on said diaphragm is less than the spring bias force.

9. The system of claim 1 wherein the temperature of a mixture of a hot fluid and a cold fluid is controlled, said control valve means being operative to change the rate of flow of one of the fluids to maintain a predetermined temperature of the mixture, said sensor being operative to detect a departure of the mixture from such predetermined temperature to produce the error signal processed by said controller, and said pilot valve means being operative in response to the output signal of said controller to position said modulating valve in proportion to the output signal to change the rate of flow of said one fluid to restore the mixture to the predetermined temperature.

10. The system of claim 9 wherein said sensor is a thermistor whose resistance decreases with increasing temperature of the mixture.

11. The system of claim 1 wherein said control valve means further has a fluid pressure inlet communicating via a restricted orifice upstream of said pilot valve means with the chamber on the side of said diaphragm opposite said one chamber and communicating via said restricted orifice and said pilot valve means with said one chamber.

12. The system of claim 11 wherein said pilot valve means is of the nozzle-flapper type, and said motor is a torque motor of which its armature constitutes said flapper.

13. An automatic process control system comprising a control valve providing a variable area orifice to change the rate of flow of a control agent to maintain a desired condition in the process; a sensor/electronic controller of which the sensor detects a departure from the desired condition to produce an error signal which is processed by said controller to provide an output signal to said valve; said valve having a diaphragm actuated modulating valve, and a motor operated pilot valve to establish a pressure differential on opposite sides of said diaphragm in response to actuation of said motor by said output signal to position said modulating valve in proportion to said output signal to change the rate of flow of said control agent to restore the process to the desired condition; and said controller having auxiliary signal inputs and signal processing means which, when said signal inputs exceed predetermined values, are operative to change the condition to which said sensor responds.

14. A system for controlling the temperature of a mixture of a hot fluid and a cold fluid comprising a control valve providing a variable area orifice to change the rate of flow of one of said fluids to maintain a predetermined temperature of the mixture; a sensor/electronic controller of which the sensor detects a departure of the mixture from the predetermined temperature to produce an error signal which is processed by said valve; said valve having a diaphragm actuated modulating valve, and a motor operated pilot valve to establish a pressure differential on opposite sides of said diaphragm in response to actuation of said motor by said output signal to position said modulating valve in proportion to said output signal to change the rate of flow of said one fluid to restore the mixture to predetermined temperature; and said controller having auxiliary signal inputs and signal processing means which, when said signal inputs exceed predtermined values, are operative to change the mixture temperature to which said sensor responds.

* * * * *